United States Patent
Thomas (10) Patent No.: US 11,061,131 B2
(45) Date of Patent: Jul. 13, 2021

(54) RADAR SYSTEMS AND METHODS

(71) Applicant: LEONARDO MW LTD., Basildon (GB)

(72) Inventor: Euan Thomas, Basildon (GB)

(73) Assignee: LEONARDO MW LTD., Basildon (GB)

( * ) Notice: Subject to any disclaimer, the term of this patent is extended or adjusted under 35 U.S.C. 154(b) by 174 days.

(21) Appl. No.: 15/775,664

(22) PCT Filed: Nov. 9, 2016

(86) PCT No.: PCT/EP2016/077064
§ 371 (c)(1),
(2) Date: May 11, 2018

(87) PCT Pub. No.: WO2017/081046
PCT Pub. Date: May 18, 2017

(65) Prior Publication Data
US 2018/0372859 A1    Dec. 27, 2018

(30) Foreign Application Priority Data
Nov. 11, 2015    (GB) .................... 1519867

(51) Int. Cl.
*G01S 13/76*    (2006.01)
*G01S 13/78*    (2006.01)
(Continued)

(52) U.S. Cl.
CPC .......... *G01S 13/762* (2013.01); *G01S 13/782* (2013.01); *H01Q 3/385* (2013.01); *H01Q 25/02* (2013.01); *G08G 5/0095* (2013.01)

(58) Field of Classification Search
CPC .... G01S 13/762; G01S 13/782; G01S 13/781; H01Q 25/02; H01Q 3/385; G08G 5/0095
(Continued)

(56) References Cited

U.S. PATENT DOCUMENTS 3,441,931 A * 4/1969 Shrader ................. G01S 13/524
                                                              342/160
3,636,563 A * 1/1972 Laverick ............ G01S 13/4409
                                                              342/427
(Continued)

FOREIGN PATENT DOCUMENTS

CN    103558594    *  2/2014  .......... G01S 7/2813
CN    103558594 A     2/2014
(Continued)

OTHER PUBLICATIONS

Machine translation of Sichuan, CN103558594A, May 2, 2014 (Year: 2014).*
(Continued)

*Primary Examiner* — Frank J McGue
(74) *Attorney, Agent, or Firm* — Buchanan Ingersoll & Rooney PC (57) ABSTRACT

A mode S Interrogation Side Lobe Suppression System (ISLS) for an electronically scanned interrogator is described. One aspect introduces the 90° phase offset between the main and control beams thereby enabling the full power capability of the TRU to be effectively utilized and the effective beamwidth in Mode S to be sharply defined. The system allows the transmission of the simultaneous ISLS pulse of a Mode S all-call interrogation to be transmitted using the same array as is used by the main beam.

6 Claims, 6 Drawing Sheets

(51) Int. Cl.
*H01Q 25/02* (2006.01)
*H01Q 3/38* (2006.01)
*G08G 5/00* (2006.01)

(58) Field of Classification Search
USPC .......................................................... 342/39
See application file for complete search history.

(56) References Cited

U.S. PATENT DOCUMENTS

| | | | | |
|---|---|---|---|---|
| 5,406,404 A | * | 4/1995 | DiGiovanni | H01S 3/06754 |
| | | | | 359/341.3 |
| 5,463,357 A | * | 10/1995 | Hobden | H04N 7/20 |
| | | | | 332/151 |
| 5,825,322 A | * | 10/1998 | Capozoli | G01S 13/762 |
| | | | | 342/37 |
| 9,048,790 B1 | * | 6/2015 | Refaeli | H03F 3/181 |
| 2004/0027268 A1 | | 2/2004 | Langsford | |
| 2010/0090882 A1 | * | 4/2010 | Donovan | G08G 5/045 |
| | | | | 342/32 |
| 2011/0136452 A1 | * | 6/2011 | Pratt | H03F 1/3241 |
| | | | | 455/127.1 |
| 2012/0217980 A1 | * | 8/2012 | Pausini | G01R 29/26 |
| | | | | 324/613 |
| 2013/0265186 A1 | * | 10/2013 | Gelli | G01S 7/02 |
| | | | | 342/32 |
| 2016/0056321 A1 | * | 2/2016 | Atwater | B64G 1/44 |
| | | | | 136/246 |

FOREIGN PATENT DOCUMENTS

| | | | | |
|---|---|---|---|---|
| GB | 1316562 | * | 9/1973 | ............ G01S 13/76 |
| GB | 1 316 562 A | | 2/2014 | |
| WO | WO 02/14896 A1 | | 2/2002 | |

OTHER PUBLICATIONS

International Search Report (PCT/ISA/210) dated Feb. 10, 2017, by the European Patent Office as the International Searching Authority for International Application No. PCT/EP2016/077064.

Written Opinion (PCT/ISA/237) dated Feb. 10, 2017, by the European Patent Office as the International Searching Authority for International Application No. PCT/EP2016/077064.

Examination Report under Section 18(3), dated Mar. 11, 2021 issued in corresponding Great Britain Patent Application No. GB1618877.3 (3 pages).

* cited by examiner

RADAR SYSTEMS AND METHODS

The invention relates to secondary radar. More specifically but not exclusively it relates to mode S Interrogation Path Side Lobe Suppression System (ISLS) for an electronically scanned interrogator General Principles of Airspace Surveillance Using Secondary Surveillance Radar Air Traffic Control systems employ secondary surveillance radar (SSR) in order to obtain flight data from aircraft in the vicinity. A coded request for information is sent as a radio signal to the platform by means of an interrogator, normally located on the ground. On receipt of this signal, the transponder on the aircraft sends a response to the interrogator providing the data requested. Distance to the aircraft can be obtained from the 2-way time delay and the direction to the target from the antenna orientation at the time of interrogation. The aircraft data is correlated with the positioned as determined by a primary surveillance radar (PSR) and the data obtained by means of the SSR is overlaid on the radar track displayed to the air traffic controller.

Interrogators normally use a system known as Mode S. The important feature of Mode S is that the interrogation request contains the address of the aircraft from which data is requested and only the transponder on that aircraft replies. This has the great advantage in reducing unnecessary signal traffic and radio interference, and moreover relieves the interrogator of the extensive processing that would otherwise be required to determine which of the potentially many replies corresponds to the reply sought.

This naturally raises the question of how the aircraft address is obtained by the interrogator in the first place. There are two methods:
1. Aircraft equipped with suitable transponders spontaneously transmit their addresses allowing the addresses to be acquired by passive listening. The interrogator can then compile a list of addresses to be interrogated as a roll call to acquire the flight data required from these newly arrived aircraft.
2. The interrogator can send an All-Call (unaddressed) interrogation to which all aircraft in the beam not currently on a roll call for that interrogator will reply with their address.

The invention to be here described applies only to the second method.

According to the invention there is provided an electronically-scanned SSR interrogator comprising transmit receive modules, the interrogator being adapted to steer a beam by applying a progressive phase taper across the transmit/receive modules.

In this way the invention allows the transmission of the simultaneous ISLS pulse of a Mode S all-call interrogation to be transmitted using the same array as is used by the main beam. In prior art systems, the requirement to transmit simultaneous ISLS pulses via an active electronically scanned interrogator has not previously arisen.

The invention will now be described with reference to the attached diagrammatic drawings in which.

INTERROGATION SIDELOBE SUPPRESSION

Interrogation Side-lobe Suppression (ISLS) is used in Secondary Surveillance Radar (SSR) to reduce the effective beamwidth of the interrogation beam. This clearly reduces the number of transponder replies, which reduces the processing task of the interrogator and reduces the general interference background to other SSR users.

Figure 1:
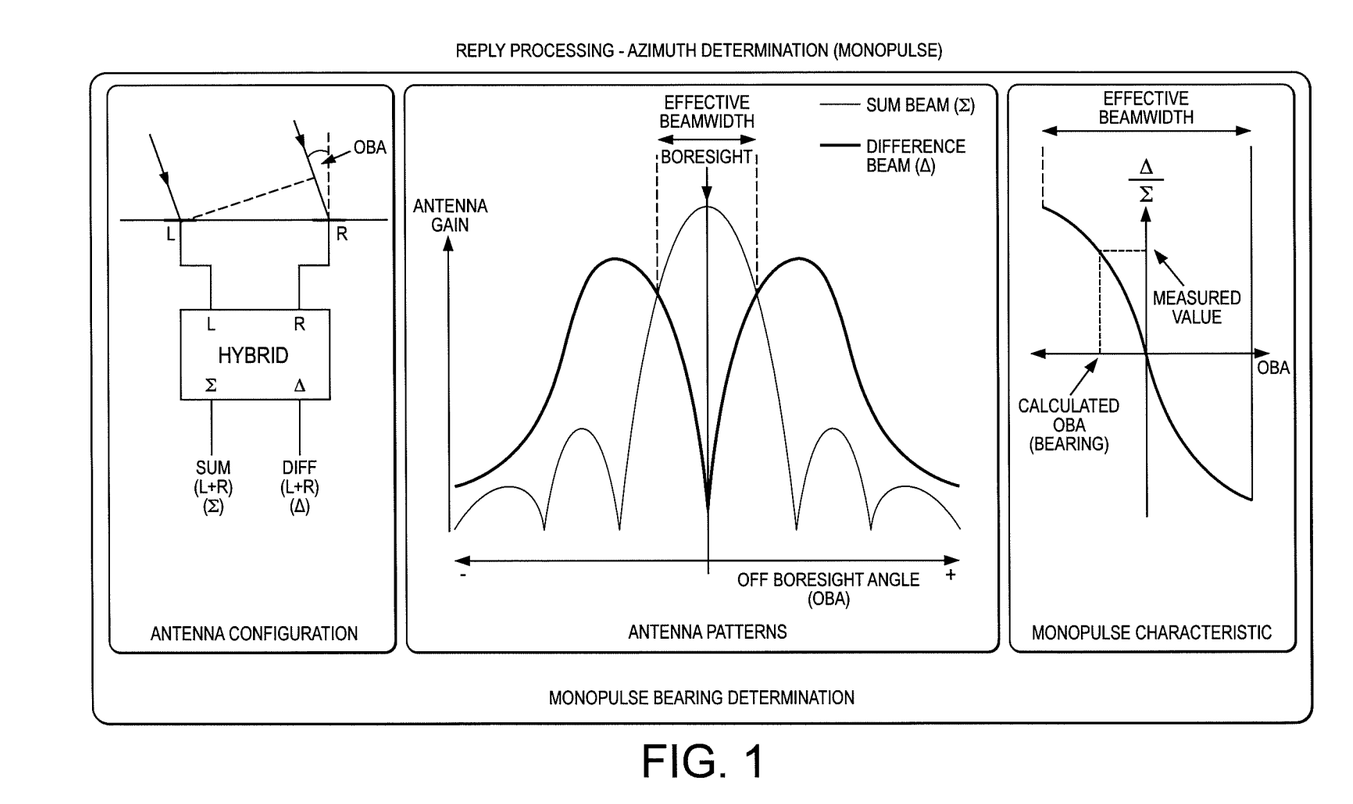
FIG. 1 is a diagram showing a typical output beam having a main lobe symmetrically disposed about an antenna axis with a few subsidiary (side) lobes either side of the main lobe.

The principle of ISLS is described below with reference to FIG. 1.

The SSR antenna is used to transmit two beams, known as the main and control beams. The main beam contains the body of the interrogation request and is transmitted as a sum beam, one in which all the antenna elements are excited in phase. This beam has a main lobe symmetrically disposed about the antenna axis with a few subsidiary (side) lobes either side of the main lobe—see below FIG. 1.

The control beam is a short pulse transmitted simultaneously with the main beam, but as a difference pattern, one in which the elements on one side of the antenna are excited in phase and those on the other in anti-phase. This produces a beam symmetric about the axis, but which has a deep null in the central portion due to the high degree of cancellation between the in-phase and anti-phase radiation components on the axis—see below FIG. 1. However FIG. 1 also indicates that with increasing angle off-axis the strength of the main beam diminishes, while that of the control beam increases. The point at which they cross determines the effective beamwidth that is the beamwidth over which the strength of the main beam exceeds that of the control beam.

Figure 2:
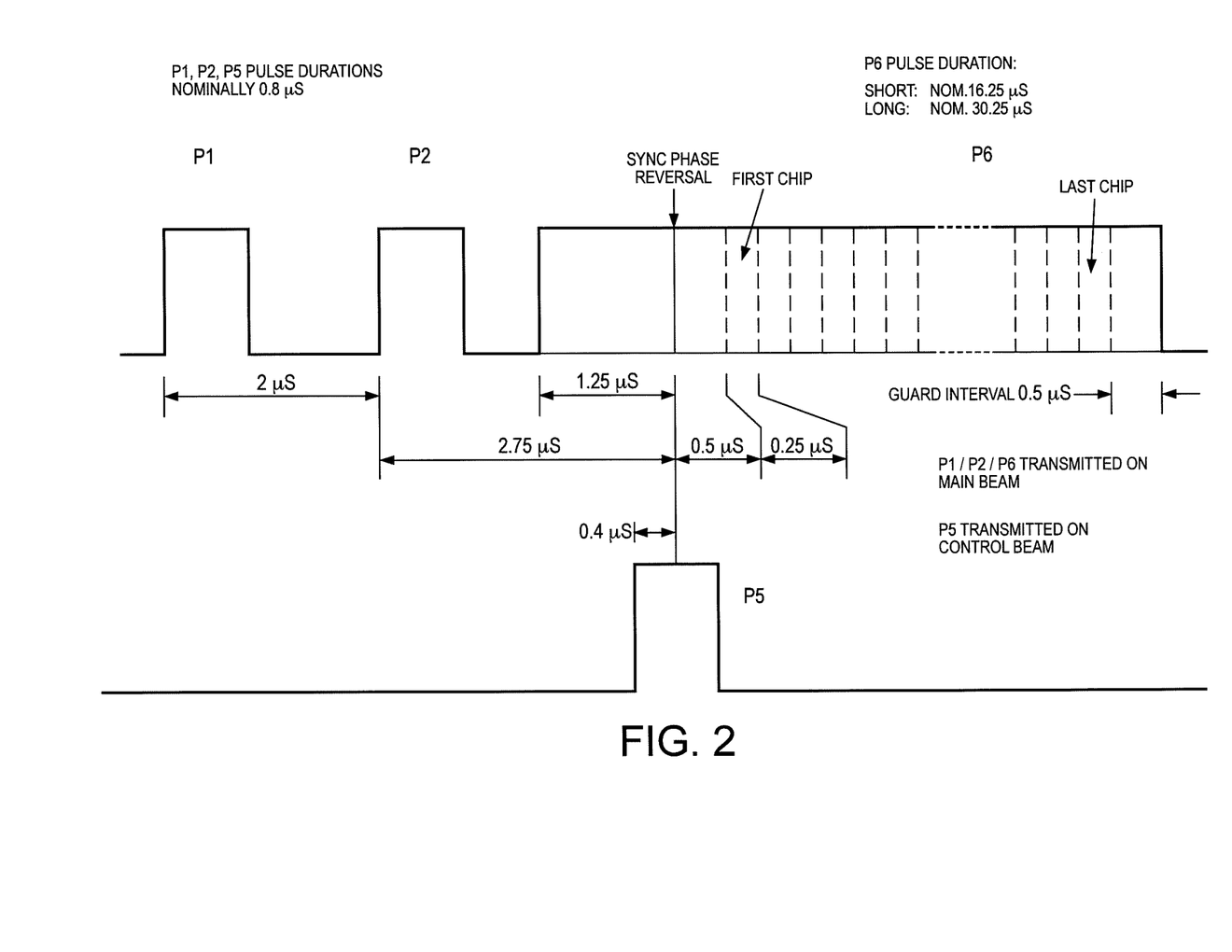
FIG. 2 is a diagram showing a mode S all-call waveform, showing pulses P5 and P6.

With reference to FIG. 2, the main beam pulse, denoted P6, contains a phase reversal in the pre-amble preceding the data stream. If this phase reversal is detected by the transponder, it processes the remainder of the Mode S transmission and responds appropriately. If this phase reversal is not detected, the transponder ignores the transmission. The control pulse P5 is transmitted during the period where the phase reversal occurs in P6. If the P5 pulse is of such a magnitude that it swamps the phase reversal in P6, the transponder will clearly not reply. Hence the effective beamwidth, where transponders will reply is in the central area of the main beam where the null in the control beam means that the phase reversal in P6 will be detected. Outside the effective beam-width, the phase reversal is obliterated by the P5 pulse.

The governing document for Mode S, ICAO Vol 4 Annex 10, prescribes no relative phase relations between the P5 and P6 pulses, so that detection or otherwise of the phase reversal depends or is assumed to depend on the relative strengths of the two signals.

The SSR antennas for Mode S interrogators are normally mounted on the Primary Surveillance Radar (PSR) antenna and these are normally rotated (scanned) together mechanically on the same turntable. Conventional interrogators for Mode S employ two separate transmitters for the main and control beams as these have to radiate simultaneously.

ISLS in Electronically-Scanned Interrogators

Where an interrogator has to be scanned electronically as, for instance in an airborne interrogator on an aircraft with insufficient space to install a mechanically scanned antenna, the antenna takes the form of an electronically steerable array. Each element is driven by means of its high power transmitter amplifier and a progressive phase taper is applied across the array to steer the beam. Varying the amount of this phase taper causes the beam steer angle to very accordingly.

Figure 3:
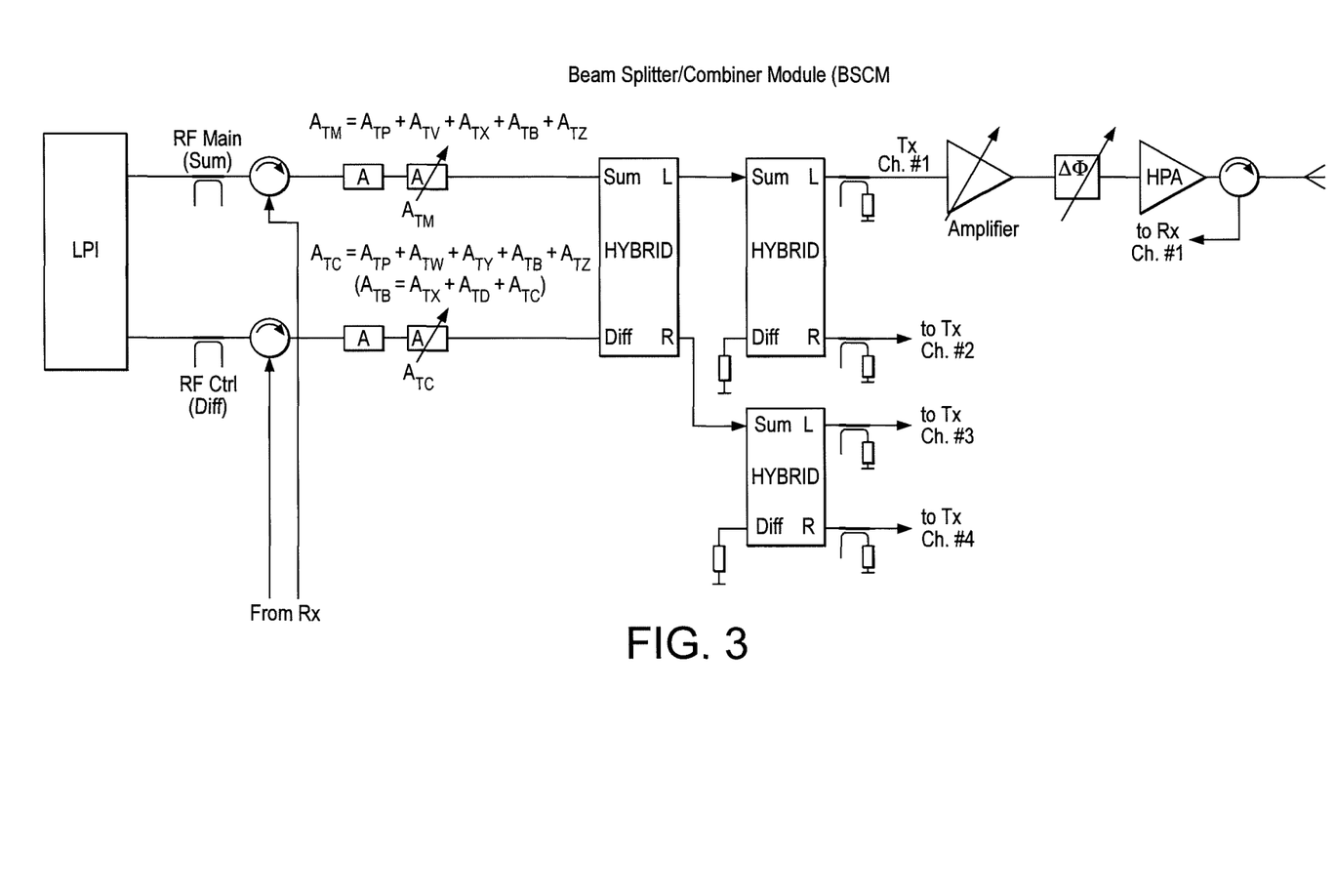
FIG. 3 is a schematic diagram showing the transmit portion only of the general architecture of a system in accordance with the invention showing a low power interrogator (LPI) producing radio frequency (RF) main (sum) and control (difference) beams at low power, which are applied to a Transmit Receive Unit (TRU)

The Figure shows a low power interrogator (LPI) producing radio frequency (RF) main (sum) and control (difference) beams at low power, which are applied to a Transmit Receive Unit (TRU). The TRU contains a number of transmit/receive modules (TRM) corresponding to the number of array elements (typically four, as in this instance of the invention, but may be any convenient number). The TRU contains a beam splitter/combiner module (BSCM) which splits the signals from the LPI four ways for input to the TRMs. Each TRM contains a digital phase shifter, digital attenuator, high power amplifier line-up (for interrogation transmission) and a low noise amplifier (for reception of replies). It is clear from the architecture that the TRMs cannot be assigned uniquely either to the main (sum) or to the control (difference) beams, since all of the TRMs are required to participate in the formation and steering of the beam. It is well to note that this situation is new. The ISLS pulse in the legacy civil air traffic interrogation modes, Mode A (flight number) and Mode C (altitude), was transmitted sequentially rather than simultaneously, so that the problem did not arise.

However, as we now show in the sequel, by using linear amplifiers in the TRMs (Class A or preferably Class AB on grounds of efficiency and thermal management) rather than Class C transmitters as used in conventional interrogators, the main and control patterns can be synthesized in the TRU. Again in the sequel, the four element implementation is referred to, but the technique applies mutatis mutandis to any convenient, preferably even, number of elements.

Mode S ISLS is mechanized in the electronically scanned interrogator by linear superposition of the P6 (main beam) and P5 (control) beam voltage amplitudes in the power amplifier (PA) of each TRM of the Transmit Receive Unit TRU.

Consider the main and control beams separately for the moment. On axis (no beam steering), the main beam is transmitted as a sum pattern with all antenna elements driven in phase. The control beam is transmitted as a difference pattern, with the phase inverted in the two right hand elements. If transmitted separately, the effect would be to produce a sum pattern and then a difference pattern as illustrated (see above FIG. 1).

Now a sum voltage $v_s$ in an array element will produce an array element current $i_s$. Since the field of the sum pattern $E_s$ at a point P in space is proportional to $i_s$ (linearity of Maxwell's equations), the sum field at P is directly proportional to $v_s$ since the amplifier line-up is linear.

By the same argument, we can see that the field of the difference pattern $E_d$ at the same point P is directly proportional to $v_d$, since the whole set-up is linear.

Again, since the system is linear, by superposition we can add the sum voltage $v_s$ to the difference voltage $v_d$, to give an element current $i_s+i_d$ and an interference pattern $E_s+E_d$ at the same point P. But this is exactly the same interference pattern that would have been produced by separate sum and difference beam transmitter in a conventional SSR interrogator. In order for a reproducible interference pattern to be created, it is necessary that the phases of the main and control beams remain coherent. These coherent Mode S transmissions are generated at low power in the LPI and subsequently superposed and power amplified in the TRU. To summarize, since the system is linear, the main and control patterns can be considered as independent transmissions that interfere in the far field (a fortiori in the neighbourhood of the receiving transponder).

Finally, in order to steer the beam, the appropriate phase taper can be applied by the TRMs to each of the four array element drive currents.

In fact as the gains of the various signals can be easily controlled (linear system), the relative magnitudes (emphasis) of the sum and difference patterns can also be varied allowing the effective beamwidth to be tailored as desired—a feature not normally available on conventional SSR interrogators with Class C amplifiers. As an additional benefit, it is worth noting that the ability to control the output power precisely conferred by a linear amplifier line-up helps to reduce interference. Power can be reduced to the level required to elicit a reply from a desired aircraft. This will assist in gaining a license from the authorities for the use of an SSR interrogator in or adjacent to controlled airspace.

Since the power output of each TRM must be shared between the main and difference patterns, the power output of the interrogator is only half the total power rating of the TRU. However, in order to achieve this maximum of half the TRU power in the main pattern, the main and control beams must be mutually coherent and in phase quadrature, otherwise the amplifier is liable to limit (become non-linear) with unpredictable consequences for the beam pattern. The phase quadrature can easily be generated by offsetting the phase of the control beam by 90° when it is generated in the LPI.

Analysis

Main Beam Power

The permissible amplitudes of the P5 and P6 pulses can be increased from $V/2$ to $V/\sqrt{2}$, where V is the maximum voltage swing in the amplifier, by the simple expedient of adding them in quadrature (i.e. with a relative phase difference of 90°).

In the left hand channels of the TRU where P6 and P5 add, we have:

$$V_{total}=V/\sqrt{2}+iV/\sqrt{2}.$$

These add vectorially to given an amplitude $|V_{total}|=V$, which does not exceed the maximum voltage swing. [If the P5 and P6 pulses were added in phase, the voltage amplitudes in each case would be limited to V/2, which would halve the power output of the main beam compared with the quadrature case (amplitude $V/\sqrt{2}$).]

In the right hand channels of the TRU where P5 is phase inverted, we have:

$$V_{total}=V/\sqrt{2}-iV/\sqrt{2}.$$

Again these add vectorially to given an amplitude $|V_{total}|=V$.

The total power outputs are then:

$$\{[V/\sqrt{2}+iV/\sqrt{2}][V/\sqrt{2}-iV/\sqrt{2}]\}/Z = V^2/Z \text{ (left hand channels)}$$

and:

$$\{[V/\sqrt{2}-iV/\sqrt{2}][V/\sqrt{2}+iV/\sqrt{2}]\}/Z = V^2/Z \text{ (right hand channels)}$$

Hence all channels are radiating full power ($V^2/Z$) and the power capability of the TRU is fully utilized.

The power in the main beam is then $[V/\sqrt{2}]^2/Z = V^2/2Z$ or half the total power as originally envisaged.

That phase coherence between the Mode S main and control channels must be maintained at all times is easily seen from the above. If the phase difference between P5 and P6 is ever significantly different from 90°, the amplifier is liable to saturate. The validity of the linearity argument for creation of the main and control beams within the TRU is then called into question.

Effect on Transponder Behaviour

The question "What effect does this additional relative phase shift of 90° between P5 and P6 have on the behaviour of the replying transponder?" immediately arises.

It might immediately be remarked that the effect of this is unlikely to be serious since, as mentioned earlier, ICAO Annex 10 itself prescribes no definite relationship between the phases of P5 and P6. Moreover, there are conventional Mode S interrogators known to the author that make use of separate Class C transmitters for the P5 and P6 pulses. For these, the phase relationship between P5 and P6 at pulse turn-on is more or less arbitrary and such interrogators appear to perform perfectly well in practice. However, it is well to look at the issue more closely.

To form the main beam along the axial direction, the array elements are driven in phase. Assuming unit amplitude, the same for all elements, the main beam amplitude M in the far field for some off-axis angle is given by:

$$M = 1 + e^{i\varphi} + e^{2i\varphi} + e^{3i\varphi} \quad (1)$$

Where $\varphi = k\, d\, \sin\theta$, k being the wavenumber ($=2\pi/\lambda$), d is the antenna element pitch and $\theta$ is the off-axis angle. The multiplicative propagation factor $e^{ikR}/R$ at range R plays no part in the analysis and has been omitted.

To steer the beam, it is necessary to introduce additional progressive phase offsets (phase taper) $\alpha$, $2\alpha$, $3\alpha$ to successive element drives. The effect of doing this is to steer the whole pattern in space; this has no effect on local transponder behaviour, so it is ignored.

Similarly, the control beam C is constructed by reversing the sign of the two right-hand elements or, equivalently, by applying an additional phase shift of $\pi$.

$$C = 1 + e^{i\varphi} - e^{2ki\varphi} - e^{3i\varphi} \quad (2)$$

Summing the geometric series for the sum beam M followed by some trigonometric manipulation, shows that the amplitude M is given by:

$$M = 4 \cos\varphi \cos(\varphi/2) e^{3i\varphi/2} \quad (3)$$

At the phase inversion of the P6 pulse (the M_beam), the sign of the amplitude of the M beam is simply reversed, viz.:

$$M\_ = -4 \cos\varphi \cos(\varphi/2) e^{3k\varphi/2} \quad (4)$$

Proceeding as in (3) for the control beam C yields:

$$C = -4i \sin\varphi \cos(\varphi/2) e^{3k\varphi/2} \quad (5)$$

Note that the control beam contains an additional factor of i, corresponding to $\pi/2$ degree phase difference from the main. Also, because of the presence of the sine term, the phase of the control beam relative to the main beam jumps by an amount $\pi$ as the boresight is crossed. This is exploited in monopulse to give the left/right of boresight decision.

There is no equation corresponding to (4) for the control beam as there is no phase inversion.

To allow for the introduction of a phase shift $\gamma$ between main and control beams, the control beam is multiplied by an additional term $e^{i\gamma}$. $\gamma$ will eventually be set to $\pi/2$ (90°), but it is better to keep the analysis general for the moment. Doing this gives:

$$C = -4i \sin\varphi \cos(\varphi/2) e^{3i\varphi/2} e^{i\gamma} \quad (6)$$

At the transponder, these beams superpose in the far field with an amplitude U=M+KC before P6 phase reversal and V=M_+KC afterwards, where the factor K allows for the introduction of control beam emphasis, if required. Normally K=1 (no emphasis).

$$U = 4 \cos(\varphi/2) e^{3i\varphi/2} [\cos\varphi - iK \sin\varphi e^{i\gamma}] \quad (7)$$

$$V = -4 \cos(\varphi/2) e^{3i\varphi/2} [\cos\varphi + iK \sin\varphi e^{i\gamma}] \quad (8)$$

The transponder detects the angle $\omega$ between the two resultant vectors U and V and responds if this angle is between $\pi/2$ and $\pi$, i.e. if the phase inversion of the main beam has been detected. In determining $\omega$, the common factor $4 \cos(\varphi/2) e^{3i\varphi/2}$ multiplying both vectors can be ignored.

It is convenient to expand U and V into real and imaginary parts as follows:

$$U = [(\cos\varphi + K \sin\varphi \sin\gamma) - iK \sin\varphi \cos\gamma] \quad (9)$$

$$V = -[(\cos\varphi + K \sin\varphi \sin\gamma) + iK \sin\varphi \cos\gamma] \quad (10)$$

At this point, it is more convenient to consider U and V as ordinary vectors (rather than complex numbers) and take their scalar product. This gives the angle in terms of $\cos\omega$ and avoids the awkward discontinuities of the tan function, i.e.:

$$U = [(\cos\varphi + K \sin\varphi \sin\gamma), -K \sin\varphi \cos\gamma] \quad (11)$$

$$V = [-(\cos\varphi + K \sin\varphi \sin\gamma), -K \sin\varphi \cos\gamma] \quad (12)$$

w is then given by:

$$\omega = \cos^{-1}\{(U \cdot V)/(|U||V|)\} \quad (13)$$

Figure 4:
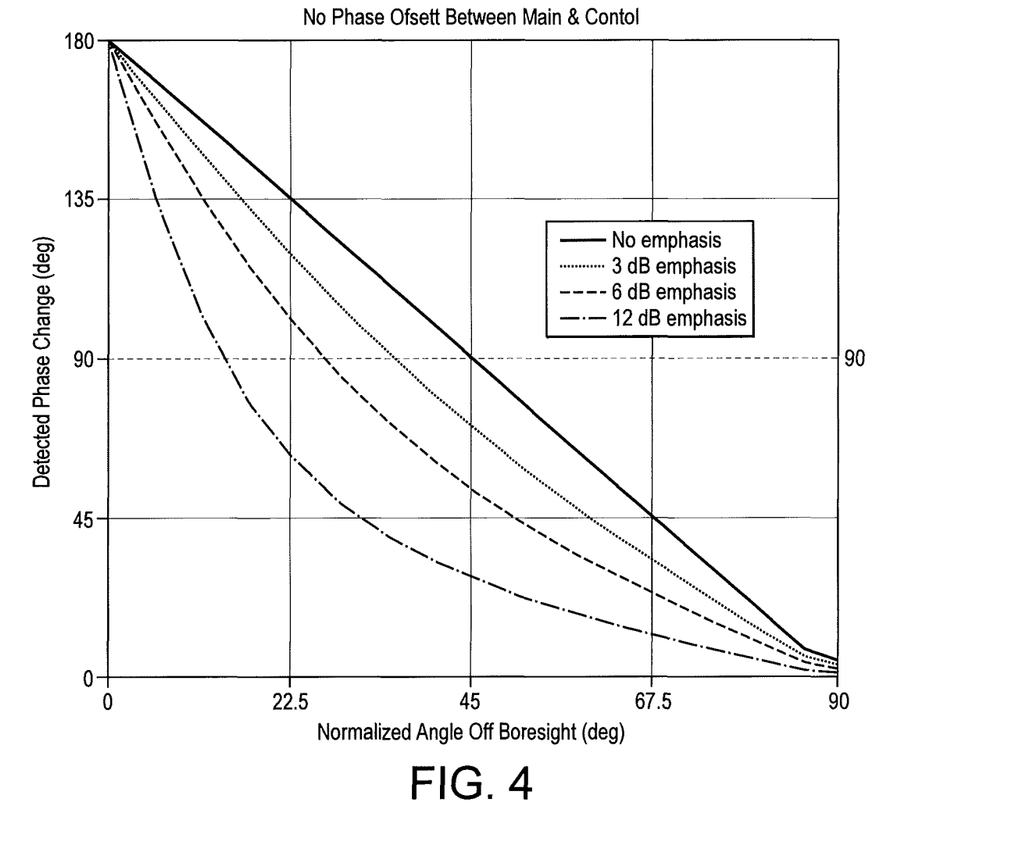
FIG. 4 is a graph showing the ISLS behaviour for in-phase P5 and P6 (main and control beams) with varying emphasis, the effect of increasing control beam emphasis being to narrow the effective beamwidth.

The behaviour of $\omega$ has been investigated for different values of control beam emphasis and phase offset of the P5 ISLS pulse. FIG. 4 below shows the ISLS behaviour for in-phase P5 and P6 with varying emphasis. As expected, the effect of increasing control beam emphasis is clearly to narrow the effective beamwidth; the sign of the phase offset does not affect the behaviour. The edge of the beam is where the detected phase change falls to 90°.

Figure 5:
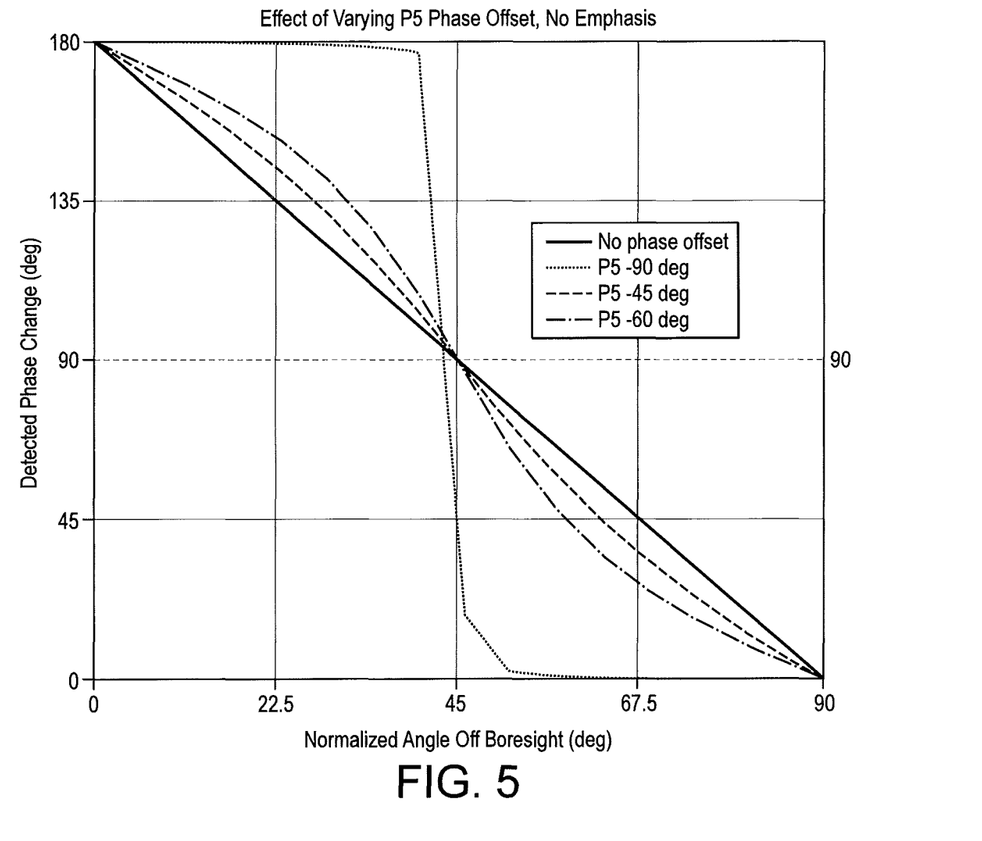
FIG. 5 is a graph showing the ISLS behaviour for varying phase offset between P5 and P6 (main and control beam) with no emphasis, the effect of increasing the phase offset being to sharpen transition from in-beam to out-of-beam without affecting the effective beamwidth.

FIG. 5 below shows the ISLS behaviour for varying phase offset between P5 and P6 with no emphasis. The effect of increasing the phase offset is to sharpen transition from in-beam to out-of-beam without affecting the effective beamwidth. At the proposed 90° offset, the transition is very sharp. This is a highly desirable feature since it means that the effective beamwidth is well defined.

Figure 6:
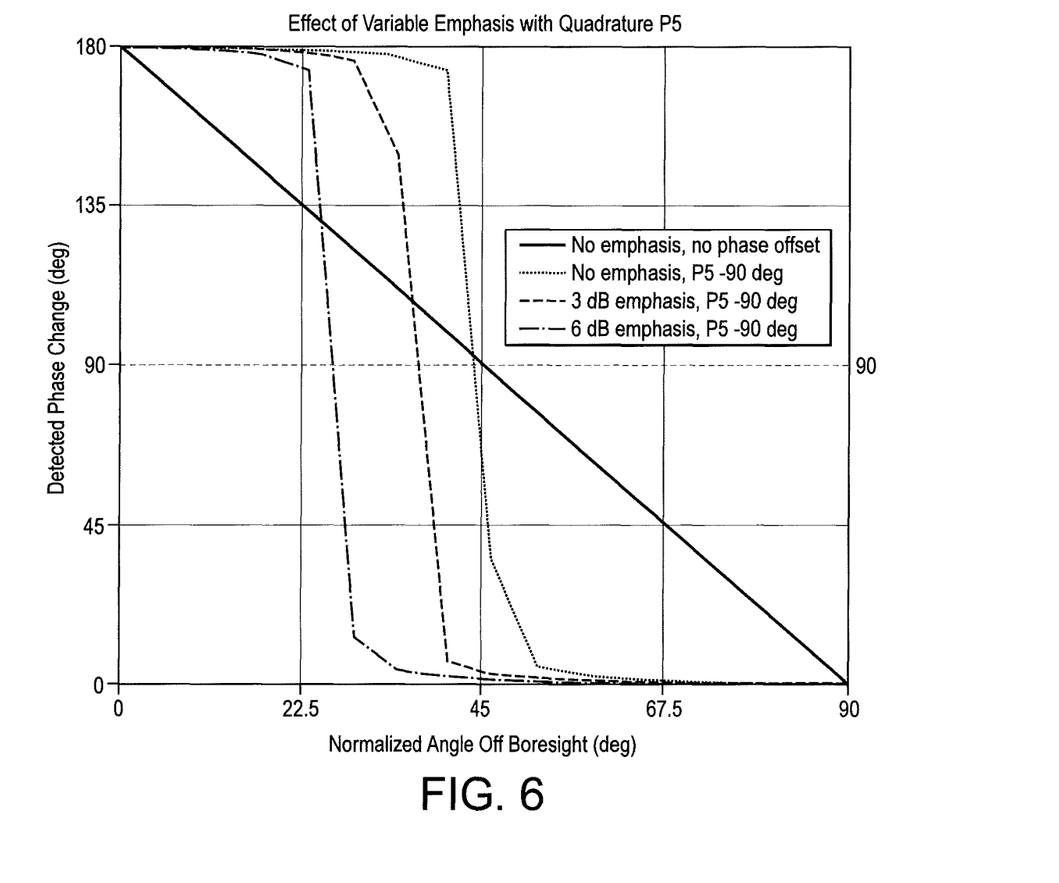
FIG. 6 is a graph showing the ISLS behaviour for the proposed 90° phase offset between P5 and P6 (main and control beams) with variable emphasis, the transition retaining its sharpness, but in which increasing the emphasis narrows the effective beamwidth, thereby indicating that the introduction of the 90° phase offset combined with variable emphasis allows excellent control of the Mode S beamwidth.

Finally, in FIG. 6 the ISLS behaviour for the proposed 90° phase offset between P5 and P6 with variable emphasis. In each case the transition retains its sharpness, but increasing the emphasis narrows the effective beamwidth. This indicates that the introduction of the 90° phase offset combined with variable emphasis allows excellent control of the Mode S beamwidth.

The conclusion is therefore that the effect of introducing the 90° phase offset is wholly beneficial since it allows:
the full power capability of the TRU to be effectively utilized;
the effective beamwidth in Mode S to be sharply defined.
In this way the invention allows the transmission of the simultaneous ISLS pulse of a Mode S all-call interrogation to be transmitted using the same array as is used by the main beam.

The invention claimed is:

1. An electronically-scanned SSR interrogator, adapted to be capable of Mode S All-Calls with simultaneous ISLS pulse, the interrogator comprising:
  a plurality of transmit modules, each transmit module including a chain of linear amplifiers permitting linear superposition of a main beam pulse and a control beam pulse, and wherein the interrogator is configured to steer the superpositioned main beam pulse and control beam pulse by applying a progressive phase taper across the plurality of transmit modules.

2. An electronically-scanned SSR interrogator according to claim 1, in which the linear amplifier chain comprises:
  class AB amplifiers.

3. A radar system, comprising:
  the electronically scanned SSR interrogator in accordance with claim 1.

4. An air traffic control system, comprising:
  the electronically scanned SSR interrogator in accordance with claim 1.

5. An electronically-scanned SSR interrogator according to claim 1, in which the main beam pulse and the control beam pulse are combined in quadrature.

6. An electronically-scanned SSR interrogator according to claim 1, comprising:
  a splitter configured to:
    receive a main beam signal and a control beam signal;
    split the main beam signal main beam signals
    split the control beam signal control beam signals; and
    input one of the split main beam signals and one of the split control beam signal s into each of the plurality of transmit modules; and
  a phase shifter configured to shift a phase of at least one of the control beam signals input to each of the plurality of transmit modules such that the main beam pulse is transmitted as a sum beam and the control beam pulse is transmitted as a difference pattern.

* * * * *